United States Patent [19]

Buret

[11] 4,268,355

[45] May 19, 1981

[54] PARASEISMIC DEVICE FOR THE HANDLING HOOD OF A NUCLEAR REACTOR

[75] Inventor: Jacqui Buret, Saulx-Les-Chartreux, France

[73] Assignee: Commissariat a l'Energie Atomique, Paris, France

[21] Appl. No.: 937,610

[22] Filed: Aug. 28, 1978

[30] Foreign Application Priority Data

Sep. 8, 1977 [FR] France .............. 77 27189

[51] Int. Cl.³ .......................................... G21C 19/20
[52] U.S. Cl. ...................................... 176/30; 414/146
[58] Field of Search ............. 176/30, 31, 32, 87; 414/146

[56] References Cited

U.S. PATENT DOCUMENTS

| | | | |
|---|---|---|---|
| 3,039,949 | 6/1962 | Newton | 176/30 |
| 3,145,636 | 8/1964 | Hall | 176/30 |
| 3,146,900 | 9/1964 | Anderson | 176/30 |
| 3,179,569 | 4/1965 | Fortescue | 176/30 |
| 3,183,162 | 5/1965 | Chemin | 176/30 |
| 3,909,350 | 9/1975 | Dupuy | 176/30 |
| 3,997,393 | 12/1976 | Allain | 176/30 |

Primary Examiner—Donald P. Walsh
Attorney, Agent, or Firm—Lane, Aitken, Ziems, Kice & Kananen

[57] ABSTRACT

Paraseismic device for a handling hood of a nuclear reactor, comprising an enclosure with a vertical axis connected to a lock communicating with a passage provided in a slab located in the upper part of the reactor.

According to the invention the device comprises, mounted between enclosure and lock, an elastic joint permitting the enclosure to perform a gimballing movement around a center located on the vertical axis of the lock, and regulatable tension tie attachment means disposed between the hood and the slab and distributed regularly about the vertical axis, each of said means having an attachment point on the hood disposed in the vicinity of a horizontal plane passing through the center of the ball and socket joint.

Application to any power or experimental reactor.

7 Claims, 3 Drawing Figures

FIG. 1
FIG. 3
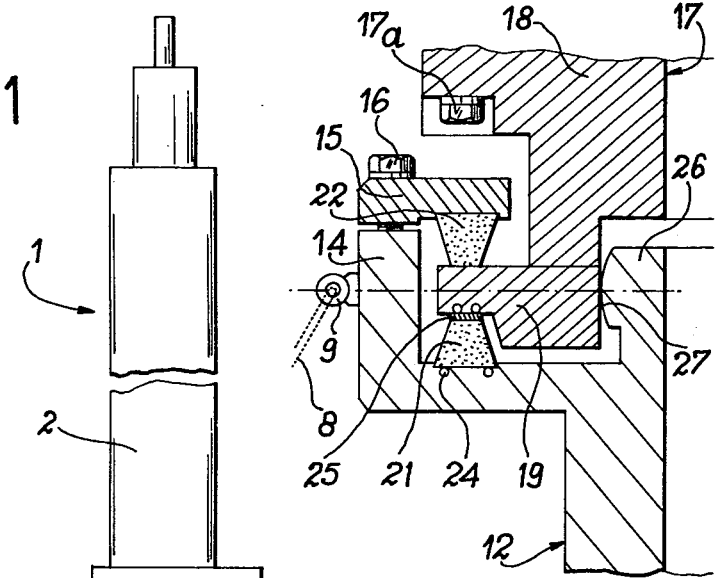
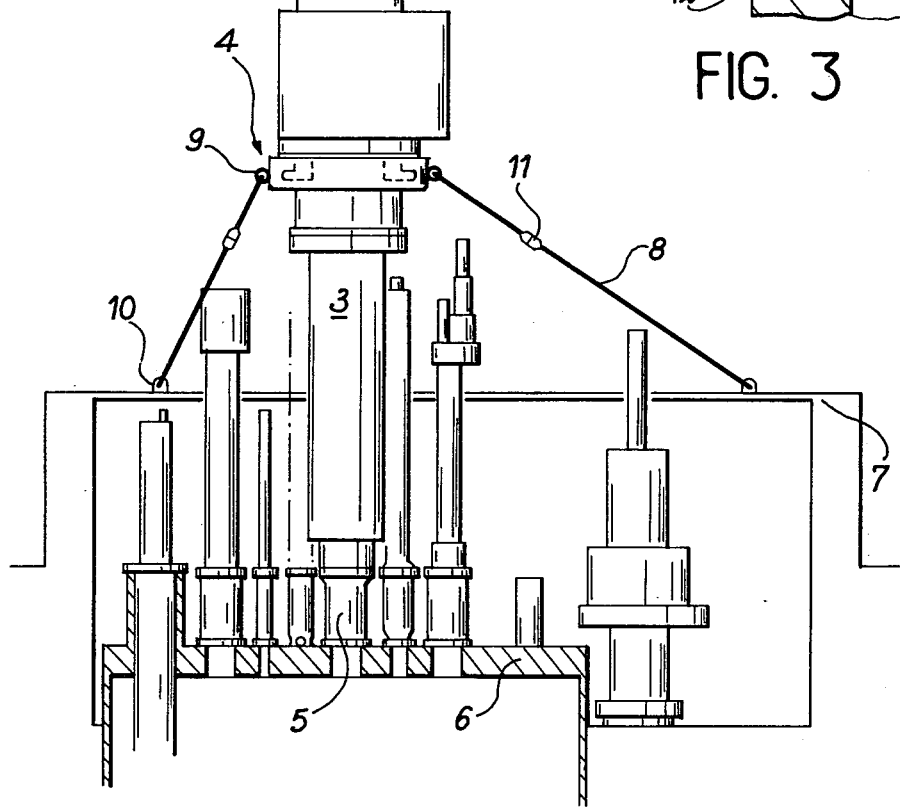

PARASEISMIC DEVICE FOR THE HANDLING HOOD OF A NUCLEAR REACTOR

BACKGROUND OF THE INVENTION

The present invention relates to a paraseismic device for the handling hood of a nuclear reactor.

It is known that in most cases nuclear reactors are surrounded by a protective caisson with thick concrete walls, sealed at its upper end by a slab having a series of tightly sealed passages, permitting access from the outer surface of the slab in the ambient atmosphere to the inside of the caisson, notably the reactor core, in order to carry out the various operations which are necessary. It is conventional practice to arrange on said slab one or several hoods, which serve to receive a reactor component and can either be removed from the latter for inspection or repair or can be introduced into the caisson for the replacement of a worn or damaged component. The connection between the hood body, generally in the form of a cylindrical enclosure with a vertical axis, displaceable on the surface of the slab by appropriate positioning means, and a passage provided in the said slab, is effected by means of a lock installed beneath the enclosure of the hood and having tight connecting means with the passage of the slab in order to ensure the necessary sealing.

Generally in nuclear reactors the enclosures of hoods have a relatively small diameter, of approximately 0.5 to 3 meters, compared with their height, which can be 25 meters, whilst the weight of the assembly can exceed 120 tonnes. Thus, in the case of earthquakes, the accelerations imposed on the hood lead to very large stresses at the connection between the lock and the slab and in the case of large shocks said stresses become completely unacceptable.

BRIEF SUMMARY OF THE INVENTION

The present invention relates to a paraseismic device for a handling hood which obviates the above disadvantages, due to a flexible connection between the hood and the slab carrying the latter, said connection being associated with a hood retaining system which subjects the later to regularly distributed stresses.

To this end the invention relates to a device for a handling hood having an enclosure with a vertical axis connected to a lock which communicates with a passage provided in a slab located in the upper part of the reactor, wherein it comprises, mounted in the enclosure and the lock, an elastic connection or joint permitting the enclosure to perform a gimballing movement around a centre located on the vertical axis of the lock, and regulatable tension tie attachment means located between the hood and the slab and regularly distributed around the vertical axis, said means each having an attachment point on the hood disposed in the vicinity of a horizontal plane passing through the centre of the ball and socket joint.

According to a special feature the elastic joint has an upper part, rigidly connected to the enclosure and comprising a horizontal annular base plate, and a lower part rigidly connected to the lock and defining, around the annular plate, an open chamber containing two elastic rings mounted between the opposite faces of the base plate and respectively two parallel bearing surfaces provided in the lower part.

According to another feature the regulatable tension tie attachment means are constituted by a plurality of stays, with adjustable ties, held taut between the hood and the slab, the attachment points of each stay on the hood being provided in the outer surface of the lower part.

In order to ensure the necessary sealing between the lock and the enclosure of the hood at the passage of the elastic joint, according to another feature of the invention the lower face of the annular plate on the one hand and the bearing surface of one of the elastic rings in the lower part on the other have grooves receiving O-rings in contact with said elastic ring. Advantageously the elastic ring has in its face in contact with the O-rings a thin metallic coating glued to the ring.

According to a particular embodiment of the invention the lower part has a vertical flange, whose outer face has a convex profile forming a ball and socket joint in contact with a cylindrical ferrule belonging to the upper part and carrying, at the opposite end to said ball and socket joint, the annular base plate.

According to another feature the lower part has a plate which is parallel to the annular base plate of the upper part and constitutes one of the bearing surfaces for one of the elastic rings, said plate being provided with a position regulating member which is able to produce an adjustable prestress by compressing the rings.

BRIEF DESCRIPTION OF THE DRAWINGS

Other features of a paraseismic device for a handling hood according to the present invention can be gathered from the following description of non-limitative embodiments and with reference to the attached drawings, wherein show:

FIG. 1: a diagrammatic view in elevation and partial cross-section of a handling hood equipped with a device according to the invention.

FIG. 3: A larger scale detail view of another variant.

DETAILED DESCRIPTION OF THE PREFERRED EMBODIMENTS

Figure 2:
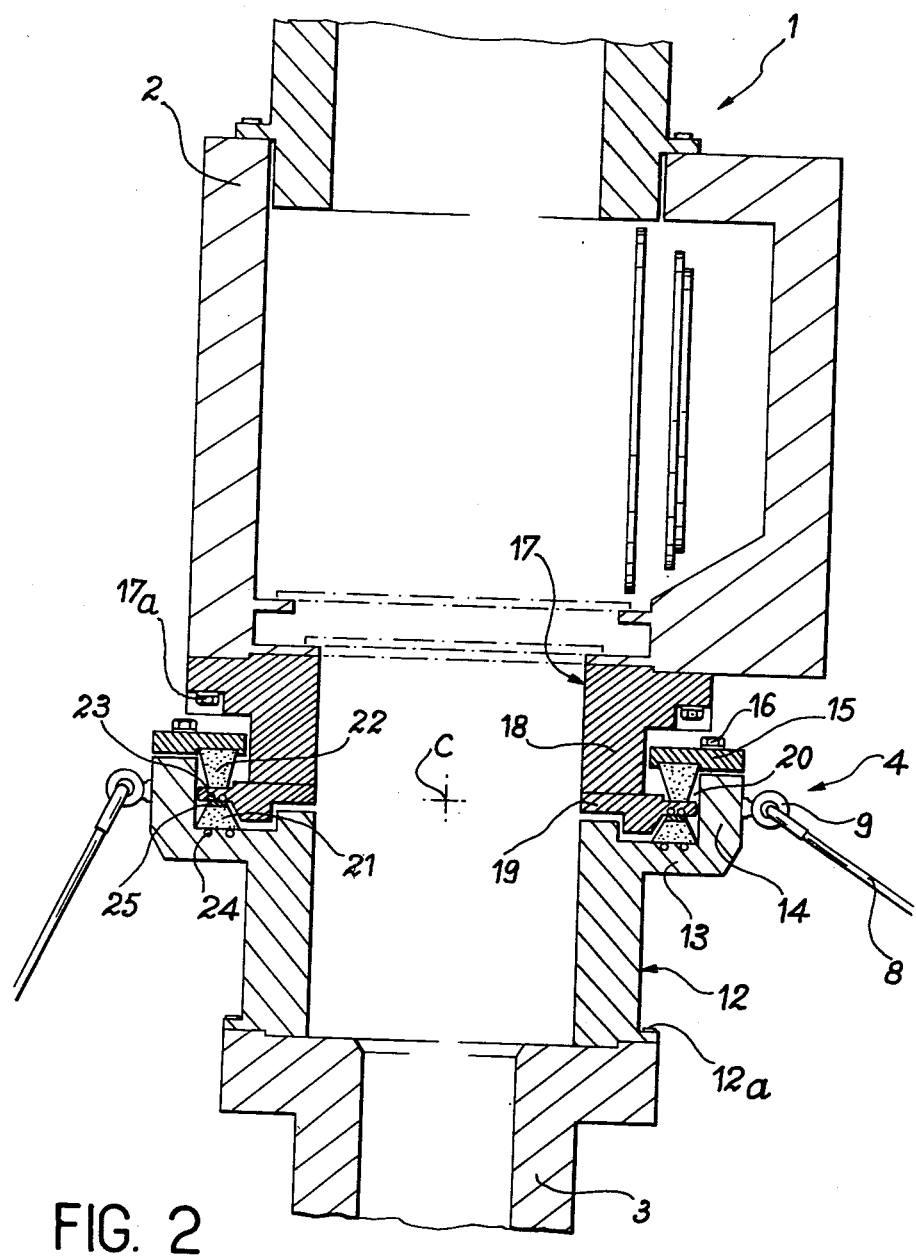
FIG. 2: a larger scale detail view in cross-section of the elastic joint mounted between the enclosure of the hood and the lock mounted beneath the latter, said elastic joint utilising the features of the invention.

In the embodiment illustrated in FIG. 1 reference numeral 1 designates a handling hood, which is shown in diagrammatic form and which more particularly comprises a generally cylindrical enclosure 2, whose diameter is essentially limited compared with its height. This enclosure with a vertical axis is extended in its lower part by a lock 3, mounted beneath the enclosure and connected to the latter by a connecting device 4 in accordance with the present invention and of which a detailed description will be given hereinafter. A coupling device 5 with a horizontal plate 6 belonging to the sealing slab 7 of the not shown caisson of a nuclear reactor is provided in the lower part of lock 3. Hood 1 is immobilised in an appropriate position with in particular its coupling member 5 located to the right of an opening made in plate 6 as a result of tie attachment means, constituted by a plurality of regulatable tension stays, whose ends are fixed on the one hand at 9 to the connecting device 4 and on the other hand at 10 to sealing slab 7.

FIG. 2 illustrates on a larger scale the structure of an embodiment of the connecting device 4 between enclosure 2 of the hood and the upper end of lock 3. According to the invention the connecting device comprises a lower part 12, fixed by means of bolts 12a to the upper flange of lock 3, whereby said part 12 has at its upper end a transverse shoulder 13 extended by a cylindrical ferrule 14, itself associated with a bearing plate 15 fixed against the lower part 12 via bolts 16 permitting the adjustment of the position of said plate 15 and the production of a regulatable prestress on the connecting device in the manner indicated hereinafter.

Enclosure 2 of the hood is in turn provided at its end with an upper part 17, fixed beneath the enclosure by bolts 17a, said part 17 having a cylindrical ferrule 18, which is coaxial to ferrule 14 of lower part 12. Ferrule 18 is terminated by an annular base plate 19 extending substantially horizontally and engaged in the open chamber 20 defined, in lower part 12, by shoulder 13, ferrule 14 and upper plate 15.

According to the invention enclosure 2 provided with its upper part 17 rests on the lower part 12 by means of two annular elastic rings 21 and 22, mounted within chamber 20 in such a way that said rings bear on the one hand on the two opposite faces of annular base plate 19 belonging to upper part 17 and on the other bear against shoulder 13 and the upper horizontal plate 15 of lower part 12. As a result the entire weight of the enclosure of the hood rests on the lock which bears on the reactor slab via elastic rings 21 and 22. The latter rings are appropriately prestressed, advantageously at the time of assembly, by action on bolts 16 in such a way that said prestress is at least equal to the weight of the hood.

Moreover in order to ensure a satisfactory sealing through connecting device 4, particularly between rings 21 and 22 and annular base plate 19, the latter plate is provided with recesses able to receive O-rings 23. Other identical recesses are provided in shoulder 13 to receive O-rings 24, whereby said O-rings 23 and 24 bear against the same lower ring 21. Preferably and in order to ensure a better sealing, whilst preventing O-rings 23 and 24 from bearing directly against the elastic material of lower ring 21, the faces in contact with the latter have a thin coating 25 of a metallic material which is glued to the ring.

As a result of the combined action of elastic rings 22 and 23 of connecting device 4 on the one hand and the stays 8 connecting the lower part 12 to slab 7 on the other in the case of severe seismic shocks enclosure 2 of the hood is able to effect a slight gimballing movement around centre C located in the plane of annular plate 19 and in which are also disposed the attachment points 9 of stays 8. During an earthquake horizontal and vertical stresses, together with a moment resulting from the accelerations produced by the vibrations of the shock are introduced by the hood at the elastic joint. The horizontal stress and the moment are largely absorbed by the stays which are under tension, whereby the latter, together with the action of the elastic rings, are able to significantly reduce the stresses imposed on the enclosure of the hood located above the connecting device. It should also be noted that in the present system the natural frequency of the vibrations of the hood is replaced by the much lower frequency of the system constituted by the hood and its elastic joint, the elastic rings ensuring an almost immediate damping of the vibrations. Thus, the hood can oscillate about centre C of the ball and socket joint with much smaller rotations than in the case of a rigid joint, the frequency of the vibrations of the elastic joint being significantly lower than that of the actual hood. Moreover, the initial compression of the elastic rings, which is at least equal to the weight of the hood, makes it possible to maintain the necessary sealing, no matter what the operating conditions and in particular in the case of seismic shocks or the like.

According to another variant, diagrammatically illustrated in FIG. 3 upper part 17 is mounted at the bottom of enclosure 2 of the hood and lower part 12 is provided in the upper part of lock 3 with annular plate 19 on which bear the two elastic rings 22 and 23. In this variant lower part 12 also has a cylindrical flange 26, in the form of a ferrule coaxial to ferrule 18 of lower part 17, having an external rounded profile 27 forming a ball and socket joint, whereby the latter comes into contact with the surface of ferrule 18 opposite to annular plate 19. This arrangement makes it possible to facilitate movements of the elastic joint and the enclosure during accelerations or impacts due to severe seismic shocks.

Obviously the invention is not limited to the embodiments described and represented hereinbefore and in fact covers all variants thereof. It is in particular obvious that the lower part fixed to the lock can serve as an adaptor for various types of locks for connection to one and the same hood, depending on the intended function of the latter.

I claim:

1. A paraseismic device for a handling hood of a nuclear reactor, comprising an enclosure with a vertical axis connected to a lock communicating with a passage provided in a slab located in the upper part of the reactor, an elastic connecting device having an annular shape, mounted on the enclosure and the lock and permitting the enclosure to perform a gimballing movement around a centre located on the vertical axis of the lock, and a plurality of regulatable tension tie attachment means located between the connecting device and the slab and regularly distributed around the vertical axis, said means each having an attachment point on the connecting device disposed in the vicinity of a horizontal plane passing through the centre of the connecting device.

2. A paraseismic device according to claim 1, wherein the elastic connecting device has an upper part, rigidly connected to the enclosure and comprising a horizontal annular base plate, and a lower part rigidly connected to the lock and defining, around the annular base plate, an open chamber containing two elastic rings mounted between upper and lower faces of the annular base plate and, respectively, two parallel bearing surfaces provided in the lower part.

3. A paraseismic device according to claim 2, wherein the plurality of regulatable tension tie attachment means comprise stays, with adjustable ties, held taut between the connecting device and the slab, the attachment points of each stay on the connecting device being provided in the outer surface of the lower part.

4. A paraseismic device according to claim 2, wherein the lower face of the annular base plate and the bearing surface of the lower part have grooves receiving O-rings in contact with one of said elastic rings.

5. A paraseismic device according to claim 4, wherein the elastic ring has in its face in contact with the O-rings of the lower face of the annular base plate a thin metallic coating glued to the ring.

6. A paraseismic device according to claim 2, wherein the lower part has a vertical flange, whose outer face has a convex profile in contact with a cylindrical ferrule belonging to the upper part, thereby defining a ball and socket joint, said ferrule including the annular base plate.

7. A paraseismic device according to claim 2, wherein the lower part has a plate which is parallel to the annular base plate of the upper part and comprises one of the bearing surfaces for one of the elastic rings, said plate being provided with a position regulating member which is able to produce an adjustable prestress by compressing the rings.

* * * * *